(12) United States Patent
Li

(10) Patent No.: US 12,031,751 B2
(45) Date of Patent: Jul. 9, 2024

(54) ENERGY EFFICIENT AND ADAPTIVE SPACE COOLING AND HEATING SYSTEM

(71) Applicant: Purdue Research Foundation, West Lafayette, IN (US)

(72) Inventor: Tian Li, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 97 days.

(21) Appl. No.: 17/561,230

(22) Filed: Dec. 23, 2021

(65) Prior Publication Data

US 2022/0290899 A1 Sep. 15, 2022

Related U.S. Application Data

(60) Provisional application No. 63/130,505, filed on Dec. 24, 2020.

(51) Int. Cl.
*F24S 50/80* (2018.01)
*F24S 50/40* (2018.01)
*F24S 60/00* (2018.01)

(52) U.S. Cl.
CPC .............. *F24S 50/80* (2018.05); *F24S 50/40* (2018.05); *F24S 60/00* (2018.05)

(58) Field of Classification Search
CPC ............. F24S 50/80; F24S 50/40; F24S 60/00
See application file for complete search history.

(56) References Cited

U.S. PATENT DOCUMENTS

| 3,174,537 | A | * | 3/1965 | Meyer | B64G 1/50 244/117 A |
| 4,559,924 | A | * | 12/1985 | Wilhelm | F24S 20/67 126/906 |
| 6,500,555 | B1 | * | 12/2002 | Khaldi | G02F 1/0147 428/457 |
| 8,047,200 | B1 | * | 11/2011 | Flaherty | F24S 10/30 126/609 |
| 2010/0300510 | A1 | * | 12/2010 | Goldman | H01L 31/0547 136/246 |
| 2013/0291858 | A1 | * | 11/2013 | Lasich | F24H 9/0015 126/651 |

(Continued)

OTHER PUBLICATIONS

Li, T. et al., Scalable and Highly Efficient Mesoporous Wood-Based Solar Steam Generation Device: Localized Heat, Rapid Water Transport. Advanced Functional Materials, vol. 28 (16), 1707134, 2018.

(Continued)

*Primary Examiner* — David J Laux
(74) *Attorney, Agent, or Firm* — Purdue Research Foundation

(57) ABSTRACT

A system and methods for heating and cooling are provided. The system may include an energy collector and an adaptive panel connected to the energy collector. The adaptive panel may a radiative cooling layer configured to dissipate heat from the energy collector. The radiative cooling layer may further include a thermo-responsive polymer configured to adjust transparency depending on temperature. The system may include a solar heating layer configured to absorb solar irradiation that passes through the radiative cooling layer and transfer heat to the energy collector.

13 Claims, 6 Drawing Sheets

(56) References Cited

U.S. PATENT DOCUMENTS

| | | | |
|---|---|---|---|
| 2016/0072429 A1* | 3/2016 | Kiani | H02S 40/22 |
| | | | 136/246 |
| 2017/0131445 A1* | 5/2017 | Koyama | B32B 27/18 |
| 2022/0021336 A1* | 1/2022 | Younes | H01L 31/0549 |
| 2022/0290424 A1* | 9/2022 | Graf | E06B 9/24 |

OTHER PUBLICATIONS

Jun, D. E. et al., Buildings—Cool smart walls Oak Ridge National Laboratory, Sep. 1, 2020, Available from: https://www.oml.gov/news/buildings-cool-smart-walls.

Tam, A. et al., Development and evaluation of a generalized rule-based control strategy for residential ice storage systems. Energy and Buildings, 197, 2019.

\* cited by examiner

ENERGY EFFICIENT AND ADAPTIVE SPACE COOLING AND HEATING SYSTEM

CROSS REFERENCE TO RELATED APPLICATIONS

This application claims the benefit of U.S. Provisional Application No. 63/130,505 filed Dec. 24, 2020, and is hereby incorporated by reference in its entity.

TECHNICAL FIELD

This disclosure relates to heating and cooling and, in particular, to passive heating and cooling systems.

BACKGROUND

Solar water heating systems have been with relatively high system efficiency during the proper heating conditions. However, a solar water heating panel occupies roof area that is not productive after sunset (e.g. 0% efficiency during the nighttime) and typically provide no cooling function.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Radiative cooling reaches its peak performance during the nighttime with the capability of reaching >10° C. cooler than the ambient air. However, challenges remain in 1) cooling energy storage (the use of cooling energy when and where needed); 2) access to the roof areas when the roof is pre-occupied with solar devices; and 3) high system complexity when integrated to the building. Solar water heating systems have been under development for decades with relatively high system efficiency. However, a solar water heating panel occupies roof area that is not productive after sunset (e.g. 0% efficiency during the nighttime). Technical challenges to rooftop/outdoor panel-based heating and cooling include, among others, (1) the availability of cost-effective and easy-to-retrofit techniques; and (2) the lack of functional materials with the desirable thermal and optical properties.

Accordingly, there is disclosed digital systems and methods for passive heating and cooling. By way of introductory example, a system may include an energy collector an adaptive panel connected to the energy collector. The adaptive panel may include a radiative cooling layer. The radiative cooling layer may include a thermo-responsive polymer configured to dissipate heat from the energy collector and adjust transparency depending on temperature. The system may further include a solar heating layer configured to absorb solar irradiation that passes through the radiative cooling layer and transfer heat to the energy collector.

In other examples, the adaptive panel may include a plurality of panel segments. Each of the panel segments may include a corresponding radiative cooling layer configured to dissipate heat from the energy collector and a corresponding solar heating layer configured to transfer heat to the energy collector. The segments may be rotatable to expose either the corresponding radiative cooling layer or the corresponding layer heating side to the sky. Additional or alternative aspects, embodiments, examples, and technical advantages are described and made evident in the system and methods described herein.

Figure 1:
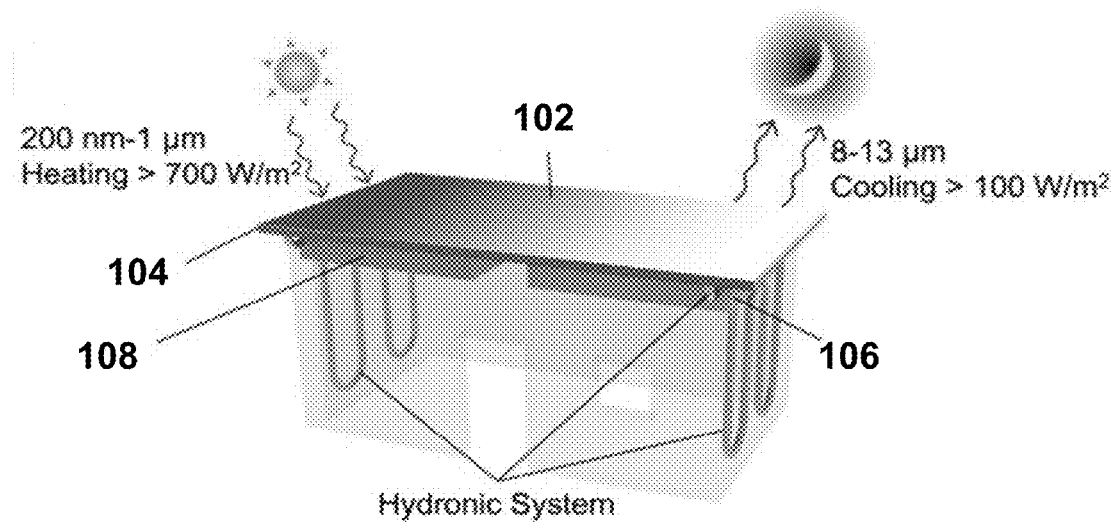
FIG. 1 illustrates a first example of a system.

FIG. 1 illustrates a first example of a system 100. The system 100 may include an adaptive heating and cooling panel 102 (hereinafter referred to as an adaptive panel). The adaptive panel 102 may include a radiant cooling layer and a solar heating layer (shown in FIGS. 2 & 3). The radiant cooling panel may dissipate thermal energy to the environment. The solar heating layer may covert solar energy from the sun to thermal energy and transfer the thermal energy to a fluid for heating purposes.

The adaptive panel 102 may vary the amount of exposure of the solar heating panel to the environment. The adaptive panel 102 may allow solar transmittance to the solar heating layer when heating is needed, and block solar transmittance while emitting strongly in the IR range when cooling is needed. The layer(s) on the adaptive panel can be manufactured in a large-scale manner, such as roll-to-roll, spray coating, etc. The adaptive panel 102 can be controlled by thermo-responsive phase change coating (see FIG. 2) or by mechanical switching (see FIG. 3) based on weather station and user-feedback (i.e. occupants' comfort). Thus, the adaptive panel 102 may operate in a heating or cooling mode.

The system may include an energy collector 104. The energy collector 104 may include fluidic pipes disposed in a thermally conductive panel. Heat may be transferred to and/or from the panel from the fluid. For example, the energy collector 104 may include a heat exchanger which receives or releases heat via the fluid that flows in and out. The energy collector 104 may include one or more outlets and one or more inlets. The energy collector 104 may physically contact the adaptive panel to transfer heat to and from the adaptive panel.

The system 100 may include or connect to hydronic system. The hydronic system may include a heating and cooling system which uses fluid to control the water and ambient temperatures of a commercial or residential building. The hydronic system may receive and supply fluid to the inlet(s) and outlet(s) of the energy collector 104.

The system 100, separate hydronic system, may include one or more thermal energy storage. The thermal energy storage(s) may include, for example, a tank for storing fluid that pass through the energy collector 104. For example, the system may include a cold thermal energy storage 106 (also herein referred to as a cold storage or cold tank) for storing cold fluid and a hot thermal energy storage for strong warm/hot fluid (also herein referred to as a hot storage or hot tank). Depending on the mode of the adaptive panel 102, fluid passing through the energy collector 104 may be redirected to the cold storage 106 or the hot storage 108. For example, when the system 100 is in cooling mode, the fluid may flow through the cold storage 106 since adaptive panel will be generating cold water. Otherwise, when system 100 is in heating mode, the fluid may be stored in the hot storage 108.

In some examples, the system 100 may be rooftop deployed seamlessly integrates into an heating ventilation and cooling (HVAC) system which receives, stores and dissipates the cooling/heating energy. The system 100 may be used in a variety of climates to offset the cooling and heating energy needs of buildings, and the fuel they use—sunshine for heating and sky for cooling—is free.

As illustrated in FIG. 1, an adaptive radiant material on the adaptive panel 102 can be used to either absorb solar energy (200 nm to 1 μm) with >700 W/m² or emit thermal energy via the sky window (8 μm to 13 μm) with >100 W/m² in a cooling mode with no or minimal energy consumption. The layer is self-adaptive to generate hot water and/or chilled water depending on the presence of the Sun, the weather, and occupant feedback, which will then be stored in tank(s) underneath the rooftop. For example, after sunset when the solar heating is not at work, the rooftop panel will automatically switch to cooling mode to provide chilled fluid to the thermal energy storage. Solar heating and radiative cooling will be at its peak performance during day and night, respectively. Thus, with a maximized exposed area to the Sun and the Sky, the generated heating and cooling power can exceed the required heating and cooling load for a one-story home, offsetting all air conditioning and heating costs.

The energy generation and storage may be optimized and characterized under different locations/weather conditions. Two parallel chilled and hot water loops with a 3-way mixing valve may be included to change/control the water inlet temperature to each panel thereby maintaining a desired interior surface temperature for thermal comfort.

Figure 2:
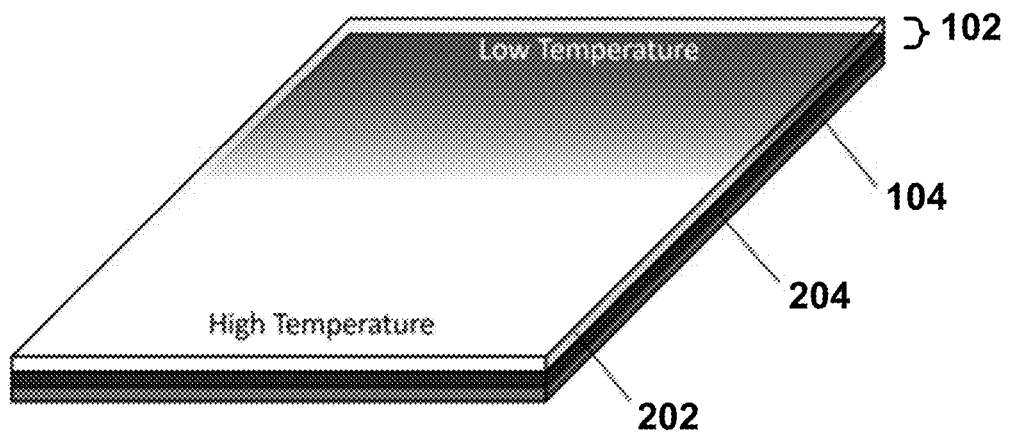
FIG. 2 illustrates an example of the adaptive panel.

FIG. 2 illustrates an example of the adaptive panel 102. The adaptive panel 102 may include a thermo-responsive radiant cooling layer 202 (hereinafter referred to as a radiant cooling layer). The radiative cooling layer 202 of the adaptive panel 102 may include a thermo-responsive material effective at dissipating thermal energy and varying transparency. For example, the thermo-responsive material may include a polymer that responses dynamically to ambient temperature variations via a "visual" phase change and induces a broadband in solar radiation reflection. The polymer may modulate the amount of solar light transmitted through the substance and thus the solar heat gain coefficient (SHGC) in response to the ambient temperature. The characteristic temperature (Tc) for which phase-transition occurs, can be tuned between 60 to 110° F., to best match climate conditions and desirable thermal properties. since the polymer reacts to ambient temperature and does not absorb visible and UV light, its characteristics are not likely to change with long-time exposure of solar radiation.

Figure 3:
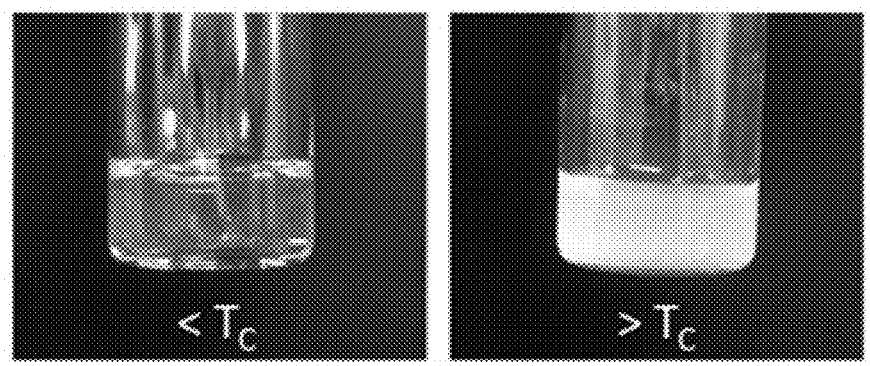
FIG. 3 illustrates an example of a test vial of a thermal-responsive polymer.

FIG. 3 illustrates an example of a test vial of a thermal-responsive polymer. The thermal responsive polymer may undergo a reversible sol-gel transition at a characteristic temperature (Tc). During this process, water molecules form hydrogen bonds along methyl cellulose chain forming a cage like structure around the chain. For example, the thermal responsive polymer may include methyl cellulose. Heating the methyl cellulose solution causes the hydrogen bonds to break and destructs the cage structure around the MC chain. This exposes the hydrophobic regions of the methyl cellulose chains, leading to the formation of hydrophobic aggregates. As the temperature keeps increasing, the number and size of these hydrophobic aggregates increases leading to the formation of a gel. As the aggregated polymer clusters grow to the size comparable to the UV-VIS-NIR wavelength, they strongly scatter sunlight and reduce the transparency of the hydrogel. The gelation temperature of the solution can be controlled by varying the concentration. As the concentration is increased the gelation temperature decreases. At low concentrations, almost all the molecules are linked to water molecules via hydrogen bonding. Lesser number of hydrogen bonds between the chains at low MC concentrations result in higher gelation temperatures. At higher concentrations, larger number of intramolecular hydrogen bonds as compared to intermolecular hydrogen bonds between water and chains leads to lower gelation temperature. In this subtask, we will establish understanding of the sol-gel transition and the effect of cellulose concentration on the phase change.

The control of hydrophobic functional group on cellulose derivatives endows the tunability of transition temperature. Salts are known to either increase or decrease the hydrophobicity of a solute in water. Ion either stabilizes and weaken the structure of water respectively. For ions that enhance the hydrophobicity of a solute will result in a decrease in the transition temperature, vice versa. Another important factor is the ionic radii of these ions. It has been reported that the ionic radii decrease as we go from $I^-$ to $F^-$ in the hofmeister series. Even though $F^-$ has the same electronegativity as $I^-$, it has a smaller ionic radius and thus a higher charge density. Therefore, the hydration ability of the ions follows the order $F^->Cl^->Br^->NO_8^->I^-$. In cases where the ions have unequal charges, both the electronegativity of the ion and the ionic radii need to be considered. Higher the charge of the ion, stronger is its gelation ability, $PO_4^{3-}>SO_4^{2-}$. The transition temperature increases by suppressing gelation.

The methyl cellulose salt system may be pre-installed into an encapsulated panel on top of a sunlight receiving layer. When the ambient temperature is higher than the transition temperature, the methyl cellulose salt panel is white which reflected the solar light and generate a cooling power up to 200 W/m². When the ambient temperature is lower than the transition temperature, the methyl cellulose salt panel is transparent and allows sunlight to transmit to the sunlight light receiving bottom layer. The sunlight light receiving layer converts solar energy into heat and can generate heating power up to 1000 W/m² under AM 1.5G solar spectrum. The receiving panel is faced to the sky/sun and will be in close contact to the water panel. The chilled water will be directed to chilled water tank while the heated water will be directed to the hot water tank.

Accordingly, the thermo-responsive radiant cooling layer 202 may appear white when the ambient temperature is high (i.e. during the summer or daytime) and possess radiative cooling capability (high reflectance in the visible spectrum and strong emittance in the infrared spectrum) to generate chilled water for space cooling. When the temperature is low (i.e. during the winter), the thermo-responsive layer will transition to transparent (high transmittance to most solar irradiation). The solar heating layer absorbs solar irradiation. The thermo-responsive layer may be tuned to have a transition temperature that optimizes the heating and cooling effect of this design. A benefit of the thermo-responsive panel quiet and fully automatic transition to accommodate the heating and cooling load of the residential areas.

Referring back to FIG. 2, the radiative cooling layer 202 may include a first side that is exposed to the environment (i.e. exposed to the sky and/or sun) and a second side that faces (and/or contacts) a solar heating layer 204. In response to a change in ambient conditions favorable for solar heat generation and/or unfavorable for heat dissipation, the radiant cooling layer 202 may increase in transparency. For example, the thermo-responsive radiative cooling layer may appear white (opaque) when the ambient temperature is high (i.e. during the summer or daytime) and possess radiative cooling capability (high reflectance in the visible spectrum and strong emittance in the infrared spectrum) to generate chilled water for space cooling. When the temperature is low (i.e. during the winter), the thermo-responsive layer will transition to transparent (high transmittance to most solar irradiation). As the transparency increases, SHGC increases and the solar heating layer 204 generates more thermal energy. The thermo-responsive layer may be tuned to have a transition temperature that optimizes the heating and cooling effect of this design.

The solar heating layer 204 may include a dark colored material that absorbs solar energy. For example, the material may be a black, preferably non-glossy, metallic or non-metallic material. In some examples, the solar heating layer 204 may include polymers, copper, aluminum, and/or steel.

Heat may be transferred to and/or between the adaptive panel and the energy collector 104. The adaptive layer includes the solar heating layer 204 at the bottom with the radiant cooling layer 202 at the top. When it is hot, the top radiant cooling layer 202 is white. The solar heating layer 204 at the bottom will not receive any solar light (will not heat up). Meanwhile, the top white layer can cool down due to radiative cooling. When it is cold, the top phase change layer is transparent and sunlight now can reach to the bottom dark layer (solar heating layer 204). The layer temperature will then rise. The changes in thermal energy are applied to the energy collector 104.

Figure 4:
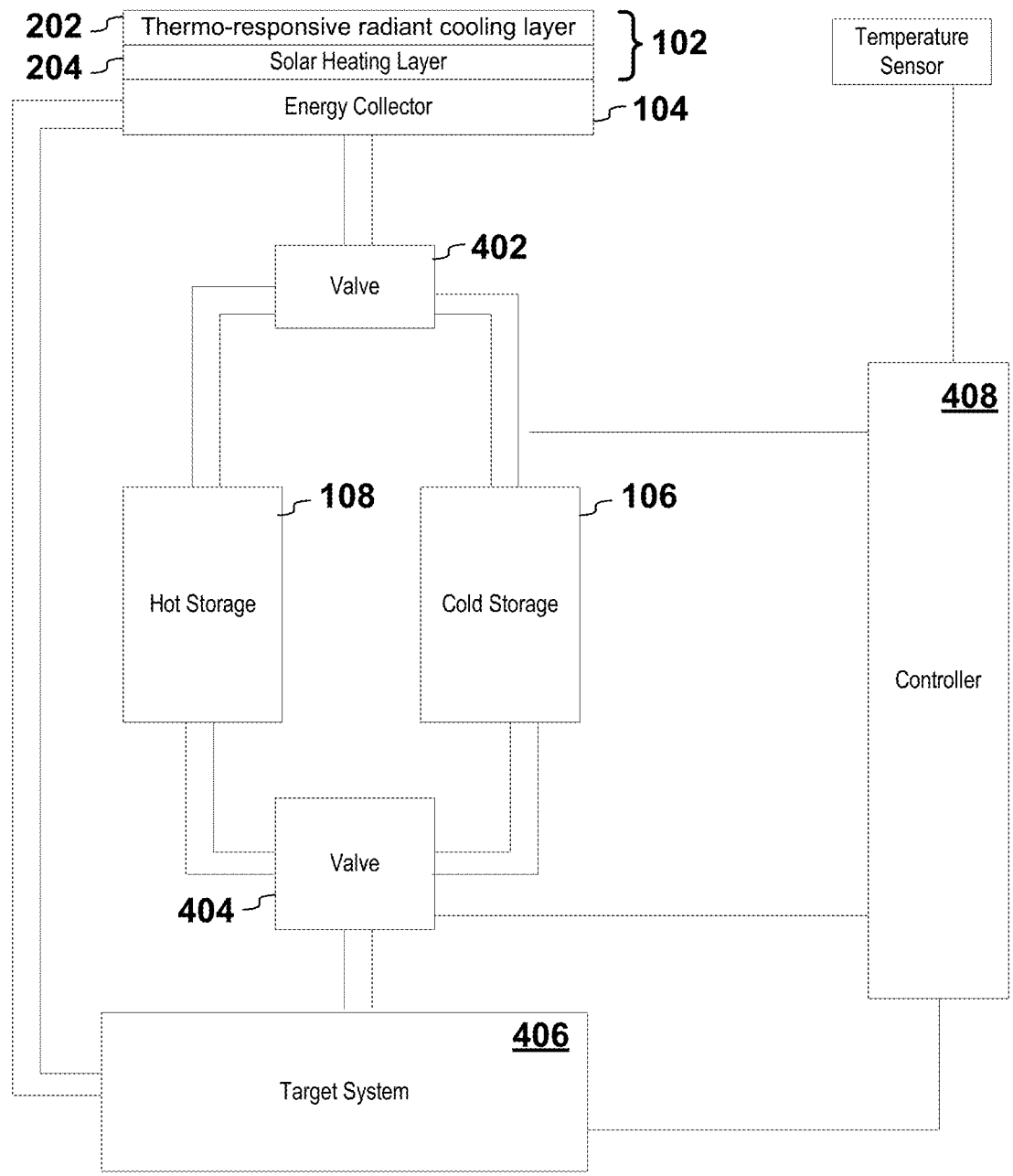
FIG. 4 illustrates a second example of a system.

FIG. 4 illustrates a second example of the system 100. The system 100 may include a valve 402 which selectively directs fluid from the energy collector 104 to the cold storage 106 or storage 108. In addition, the system may include a valve 404 which direct fluid from the hot and cold storage to a target system 406. In some examples, the valve 404 may include a mixing valve, which mixes fluids from the hot and cold storage to a desired temperature.

The target system 406 may include, in various examples, any system which transfers heat to or from the fluid passing through it. For example, the target system may include an HVAC system for a commercial or residential structure.

It should be appreciated that in some examples, the system 100 may connect the hot and cold storage directly to the target system, and the target system may have the valve 404 and/or other components which utilize the fluid.

In some examples, the system may include a controller 408. The controller may cause action of one or more of the valves 404-404. Alternatively or in addition, the controller may operate the target system 406. For example, the controller may be included in a HVAC control unit. In some examples, the controller may communicate with a user interface that allows users to control the environmental conditions in a residential or commercial structure.

In some examples, the system 100 may include a temperature sensor (or multiple temperature sensors). The temperature sensor may measure the ambient temperature proximate to the adaptive panel 102, the temperature of the adaptive panel 102, and/or the temperature of the fluid. The ambient temperature, the temperature of the adaptive panel, and/or the temperature of the fluid flow thing through may be compared with a threshold value to determine whether the adaptive panel 102 is providing heating or cooling.

It should be appreciated that other configurations of the system 100 are possible. For example, the hot storage 108 may be connected to devices which utilize the hot fluid, such as a water heater. Furthermore, the system 100 may be implemented in many ways. The system may include the adaptive panel alone or in combination with the energy collector 104, the cold storage 106, the hot storage, 108, the valves 402-404, the target system 406, and/or the controller 408. In yet other examples, the energy collector may connect to separate hot and cold loops for a hydronic system, separate from the system 100.

Figure 5:
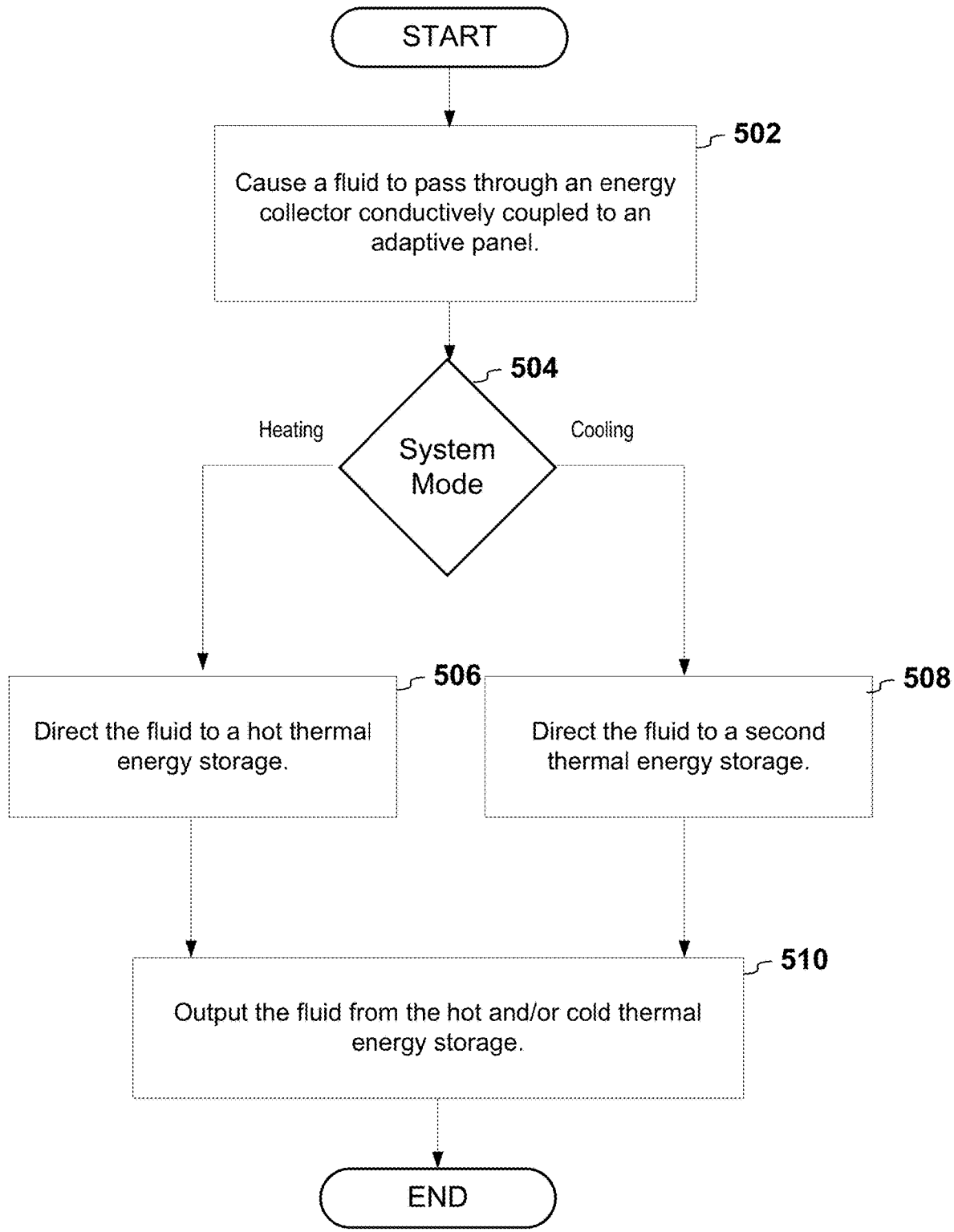
FIG. 5 illustrates a flow diagram for operations of a system.

FIG. 5 illustrates a flow diagram for operations of the system 100. The system 100 may cause a fluid to pass through the energy collector 104 conductively coupled to an adaptive panel (502). The system 100 may determine whether cooling mode or heating mode is enabled (504). Cooling mode may be based on a one or more condition. Satisfaction of the condition(s) may result in a determination that cooling mode is enabled. For example, if the ambient temperature outside the adaptive panel is less or equal to the characteristic temperature ($T_c$) threshold at which the adaptive panel transitions between transparent and non-transparent, then the system may determine cooling mode is enabled (or enable cooling mode as the case may be). Alternatively, if the ambient temperature outside the panel is greater or equal to the $T_c$, threshold, then the system may determine heating mode is enabled (or enable heating mode as the case may be).

Other conditions may determine cooling or heating mode. For example, a demand of heating and cooling may determine heating or cooling mode. The controller, for example, may determine when a heating or cooling demand is present based on, for example, a schedule, user input, an internal temperature, or a combination thereof. If the radiant cooling layer is transparent and a demand for heating is present, then the system may enter heating mode, thereby causing the adaptive panel to supply hot fluid to the hot storage. Likewise, if the radiant cooling layer is non-transparent and a demand for cold energy is present, then the system may enter cooling mode, thereby causing the adaptive panel to the cold storage.

In response to heating mode being enabled, the system 100 may direct fluid from the adaptive panel to a hot storage (aka hot storage) (506). In response to cooling mode being enabled, the system 100 may direct the fluid to a cold storage (508). Directing the fluid to the hot or cold storage may involve controlling 3-way valve where water flowing from the adaptive panel is silently directed to one panel or another.

The system 100 may output the fluid from the hot and/or cold storage (510). For example, the system 100 may control a mixing valve in which hot and cold fluid are mixed to a mixing temperature. The temperature of the mixed fluid may be based on, for example, desired environmental conditions, user provided input, or other logic traditionally used in an HVAC system or the like.

Figure 6:
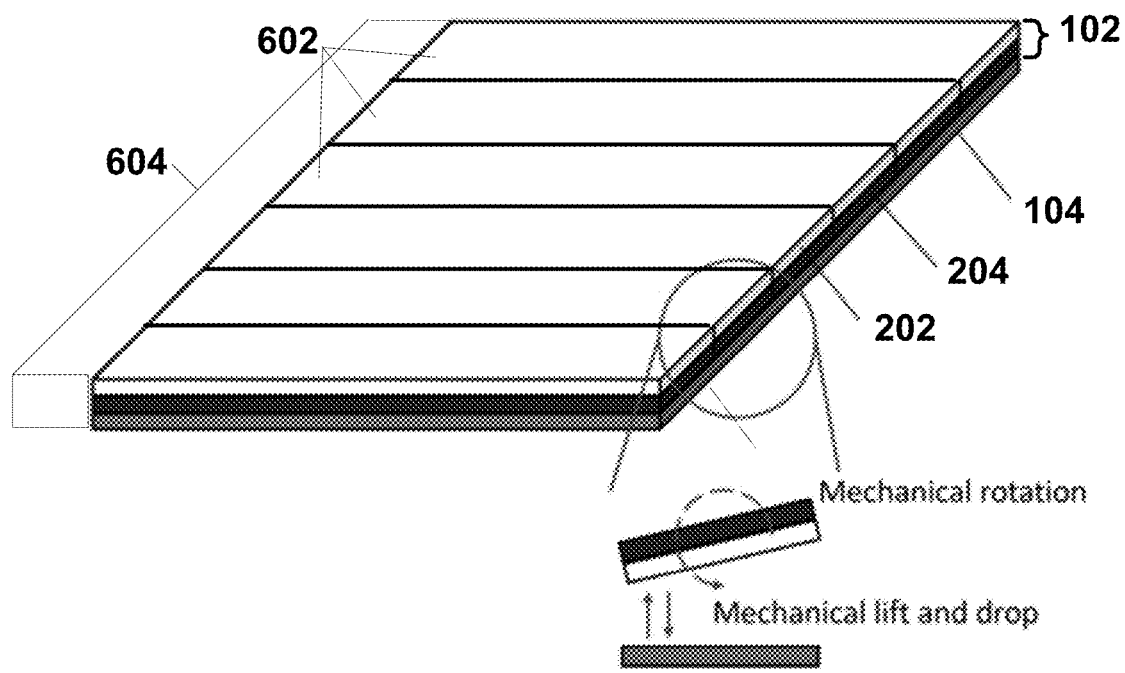
FIG. 6 illustrates a third example of a system.

FIG. 6 illustrates a second example of the system 100. An additional or alternative method to achieve adaptive heating and cooling is mechanically switching the heating and cooling layers. The adaptive panel 102 may have segments 602 that mechanically lift and/or rotate. Each of the segments 602 may include, for example, at least two layers where a first layer includes a portion of the radiative cooling layer 202, and the second layer includes a portion of the solar heat layer 204. The radiative cooling layer 202 may define the outer surface of the adaptive panel during cooling mode and the solar heating layer 204 may define the outer surface of the adaptive panel 102 during heating mode. When the adaptive panel 102 enters cooling mode, the segments 602 may rotate such that the radiative cooling layer faces the environment, shielding the solar heating layer 204 from the sun/sky. Likewise, when the adaptive panel 102 enters heating mode, the segments 602 may rotate such that the solar heating layer 204 faces the sun/sky.

In some examples, a weather station will work together to monitor the temperature and solar irradiation. With strong sun irradiation, an automated mechanical system will lift and rotate the panel segments 602 making the solar heating layer 204 face up to the sky generating hot water. Otherwise, the radiative cooling layer will face up to generate chilled fluid. The mechanical system can also be controlled manually to provide additional flexibility to the end-users.

To mechanically lift and/or rotate the segments 602, the system may include one or more rotors 604 that rotates the receiving panel to facilitate the transition between heat emitting white layer and sunlight receiving black layer given the ambient temperature. The rotor(s) 604 may include, for example one or more motor and/or linkages that cause mechanical rotation of the segments. In some example, the rotor(s) may be controlled by the controller, or the like, and rotate in response to heating or cooling mode being enabled. Alternatively or in addition, the rotor(s) may also connect to a weather station and facilitate the change of layers upon sunset/sun rise. Hot water will be generated when Sun is up with solar receiving layer, while chilled water will be generated when Sun is absent with heat emitting layer. The rotor motion will also trigger the valve(s) that direct the water flow to either hot water tank or chilled water tank.

Figure 7:
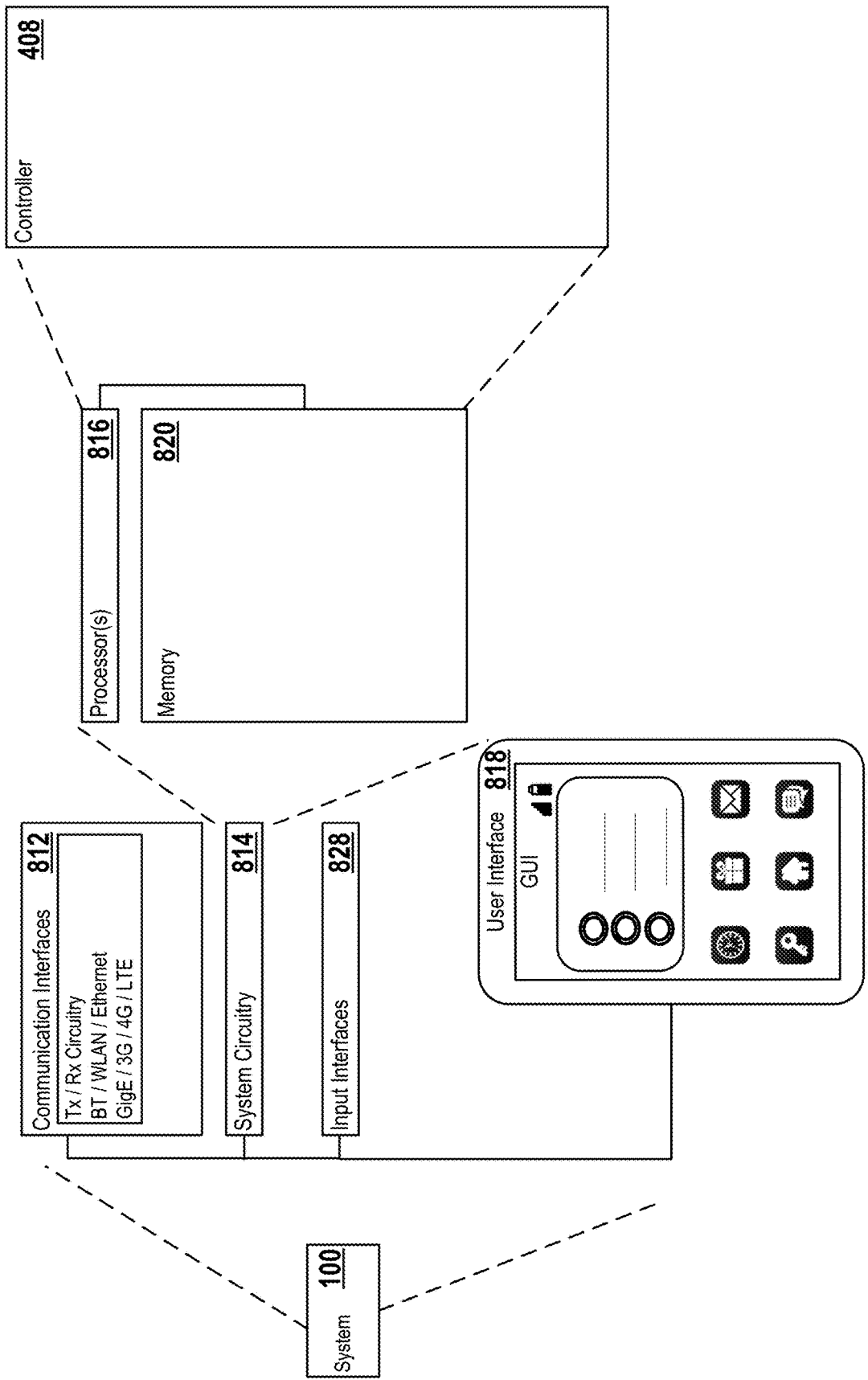
FIG. 7 illustrates a fourth example of a system.

FIG. 7 illustrates a fourth example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the controller 408 and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the controller 408 and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the controller or any component or subcomponent which controls the any aspect of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for heating and cooling, comprising:
   passing a fluid through an energy collector conductively coupled to an adaptive panel having a radiant cooling layer and a solar heating layer;
   entering a heating mode in which the radiant cooling layer is transparent;
   directing the fluid to a first thermal energy storage in response to the heating mode;
   entering a cooling mode in which the radiant cooling layer is non-transparent; and
   directing the fluid to a second thermal energy storage in response to the cooling mode.

2. The method of claim 1, further comprising:
   at least partially heating or cooling a residential or commercial structure with the fluid.

3. The method for claim 1, wherein passing the fluid through the energy collector comprises pumping the fluid through a passageway in which heat is transferred between the fluid and the adaptive panel.

4. The method of claim 1, wherein entering a heating mode comprises:
   detecting an ambient temperature is greater than a threshold temperature at which the adaptive panel is or turns transparent.

5. The method of claim 1, wherein entering a cooling mode comprises:
   detecting an ambient temperature is less than a threshold temperature at which the radiant cooling layer is or turns non-transparent.

6. The method of claim 1, wherein directing the fluid to a first thermal energy storage in response to the heating mode further comprises:
   causing a valve to permit fluid to flow from the energy collector to the first thermal energy storage.

7. The method of claim 1, wherein directing the fluid to a second thermal energy storage in response to the cooling mode further comprises:
   causing a valve to permit fluid to flow from the energy collector to the second thermal energy storage.

8. A system for heating and cooling, comprising:
   an adaptive panel connected to the energy collector, the adaptive panel comprising:
      a radiative cooling layer configured to dissipate heat from the energy collector, the radiative cooling layer comprising a thermo-responsive polymer configured to adjust transparency depending on temperature, and
      a solar heating layer configured to absorb solar irradiation that passes through the radiative cooling layer and transfer heat to the energy collector; and
   a processor, the processor configured to:
   cause fluid to flow from the adaptive panel to a first thermal energy storage when the radiant cooling layer is transparent, and
   cause fluid to flow from the adaptive panel to a second thermal energy storage when the radiant cooling layer is transparent.

9. The system of claim 8, wherein the processor is further configured to:
   detect an ambient temperature is greater than a threshold temperature at which the adaptive panel is or turns transparent.

10. The system of claim 8, wherein the processor is further configured to:
    detect an ambient temperature is less than a threshold temperature at which the adaptive panel is or turns non-transparent.

11. The system of claim 8, wherein the processor is further configured to:
    cause a valve to selectively control flow from the energy collector to a first thermal energy storage and a second thermal energy storage.

12. The system of claim 8, wherein the radiant cooling layer includes methyl cellulose.

13. The system of claim 8, wherein the solar heating layer is exposed to an environment when the thermo-responsive polymer is transparent and the solar heating layer is covered from the environment when the thermo-responsive polymer is non-transparent.

* * * * *